United States Patent
Jung et al.

(10) Patent No.: US 12,175,362 B2
(45) Date of Patent: Dec. 24, 2024

(54) ELECTRONIC APPARATUS AND METHOD OF CONTROLLING THEREOF

(71) Applicant: Samsung Electronics Co., Ltd., Suwon-si (KR)

(72) Inventors: Hyunjoo Jung, Suwon-si (KR); Chiyoun Park, Suwon-si (KR); Jaedeok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 17/086,895

(22) Filed: Nov. 2, 2020

(65) Prior Publication Data
US 2021/0142171 A1    May 13, 2021

Related U.S. Application Data

(60) Provisional application No. 62/934,798, filed on Nov. 13, 2019.

(30) Foreign Application Priority Data

May 22, 2020    (KR) .................... 10-2020-0061815

(51) Int. Cl.
G06N 3/08    (2023.01)
(52) U.S. Cl.
CPC ...................... *G06N 3/08* (2013.01)
(58) Field of Classification Search
None
See application file for complete search history.

(56) References Cited

U.S. PATENT DOCUMENTS 10,353,862 B2    7/2019    Henry et al.
11,468,147 B1 *  10/2022   Hofer .................. G06N 3/084
(Continued)

FOREIGN PATENT DOCUMENTS

CN    110414426 A    11/2019
CN    110543901 A    12/2019
(Continued)

OTHER PUBLICATIONS

Y Qian et al. Deep learning for steganalysis via convolutional neural networks. 2015. [retrieved on Nov. 13, 2023] <URL: https://www.spiedigitallibrary.org/conference-proceedings-of-spie/9409/94090J/Deep-learning-for-steganalysis-via-convolutional-neural-networks/10.1117/12.2083479.full?SSO=1> (Year: 2015).*

(Continued)

*Primary Examiner* — Bion A Shelden
(74) *Attorney, Agent, or Firm* — Jefferson IP Law, LLP

(57) ABSTRACT

An electronic apparatus is provided. The apparatus includes a communicator, a memory configured to store a neural network model, an activation function generating module that generates activation function information used in the neural network model, first activation function information, second activation function information, and third activation function information generated based on the first activation function information and the second activation function information, and a processor configured to receive fourth activation function information from an external device through the communicator, based on type information on the fourth activation function information corresponding to the second activation function information, input the first activation function information and the fourth activation function information to the activation function generating module to generate fifth activation function information, and control the neural network model to change the activation (Continued)

function information used in the neural network model from the third activation function information to the fifth activation function information.

20 Claims, 10 Drawing Sheets

(56) References Cited

U.S. PATENT DOCUMENTS

| | | | | |
|---|---|---|---|---|
| 2016/0358070 | A1* | 12/2016 | Brothers | G06N 3/082 |
| 2019/0042924 | A1 | 2/2019 | Pasca et al. | |
| 2019/0114531 | A1* | 4/2019 | Torkamani | G16H 50/30 |
| 2019/0138882 | A1 | 5/2019 | Choi et al. | |
| 2019/0147323 | A1* | 5/2019 | Li | G06N 3/047 |
| | | | | 706/15 |
| 2019/0180179 | A1 | 6/2019 | Beyene | |
| 2020/0005143 | A1* | 1/2020 | Zamora Esquivel | G06N 3/048 |
| 2020/0257981 | A1* | 8/2020 | Chae | G06N 3/048 |
| 2021/0027147 | A1* | 1/2021 | Baker | G06N 3/084 |

FOREIGN PATENT DOCUMENTS

| | | |
|---|---|---|
| CN | 110555523 A | 12/2019 |
| KR | 10-2016-0143548 A | 12/2016 |
| KR | 10-2019-0051755 A | 5/2019 |
| WO | 2020/149511 A1 | 7/2020 |

OTHER PUBLICATIONS

J Kim et al. Plug-in, Trainable Gate for Streamlining Arbitrary Neural Networks. Apr. 3, 2020. AAAI Conference on Artificial Intelligence. Retrieved from internet on Aug. 4, 2024. <URL: https://ojs.aaai.org/index.php/AAAI/article/view/5872> (Year: 2020).*
Sangchul Hahn et al, "Gradient Acceleration in Activation Functions", arXiv: 1806.09783v1, Jun. 26, 2018.
Jaedeok Kim et al., "Differentiable Pruning Method for Neural Networks", arXiv:1904.10921v1, Apr. 24, 2019, retrieved on Jan. 20, 2021.
Snehanshu Saha et al., "Evolution of Novel Activation Functions in Neural Network Training with Applications to Classification of Exoplanets", arXiv:1906.01975v1, Jun. 1, 2019, retrieved on Jan. 20, 2021.
International Search Report dated Feb. 15, 2021, issued in International Application No. PCT/KR2020/015194.
Written Opinion dated Feb. 15, 2021, issued in International Application No. PCT/KR2020/015194.
Zuo et al.; Adaptive Activation Function Generation for Artificial Neural Networks through Fuzzy Inference with Application in Grooming Text Categorisation; IEEE International Conference on Fuzzy Systems (FUZZ-IEEE); XP 033626823; Jun. 23, 2019.
Zamora-Esquivel et al.; Adaptive Activation Functions Using Fractional Calculus; 2019 IEEE/CVF International Conference on Computer Vision Workshop (ICCVW); XP 033732670; Oct. 27, 2019.
Extended European Search Report dated Jul. 22, 2022; European Appln. No. 20887665.6-1203 / 4004829 PCT/KR2020015194.

* cited by examiner

ELECTRONIC APPARATUS AND METHOD OF CONTROLLING THEREOF

CROSS-REFERENCE TO RELATED APPLICATION(S)

This application is based on and claims priority under 35 U.S.C. § 119(e) of a U.S. Provisional application Ser. No. 62/934,798, filed on Nov. 13, 2019, in the United States Patent and Trademark Office, and under 35 U.S.C. § 119(a) of a Korean patent application number 10-2020-0061815, filed on May 22, 2020 in the Korean Intellectual Property Office, the disclosure of each of which is incorporated by reference herein in its entirety.

BACKGROUND

1. Field

The disclosure relates to an electronic apparatus and a method of controlling the electronic apparatus. More particularly, the disclosure relates to an electronic apparatus capable of generating an activation function having high calculation speed and excellent learning performance by using two different activation functions and a method of controlling thereof.

2. Description of the Related Art

Recently, with the development of the artificial intelligence, neural network models including artificial neural networks, such as a deep neural network (DNN), have been used in various technical fields, and thus research into improving the performance of the neural network models have been ongoing.

In particular, the performance of the neural network model may vary depending on the activation function used in the neural network model. There is a problem in that the calculation speed of the neural network model decreases if a complex activation function is used to improve the learning performance of the neural network model, and on the contrary, the learning performance of the neural network model decreases if a simple activation function is used to improve the calculation speed of the neural network model.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that can generate an activation function having high calculation speed and excellent learning performance based on an activation function with high calculation speed and an activation function with excellent learning performance, and a method of controlling thereof.

Additional aspects will be set forth in part in the description which follows and, in part, will be apparent from the description, or may be learned by practice of the presented embodiments.

In accordance with an aspect of the disclosure, an electronic apparatus is provided. The apparatus includes a communicator, a memory configured to store a neural network model, an activation function generating module that generates activation function information used in the neural network model, first activation function information, second activation function information, and third activation function information generated based on the first activation function information and the second activation function information, and a processor configured to receive fourth activation function information from an external device through the communicator, based on type information on the fourth activation function information corresponding to the second activation function information, generate fifth activation function information by inputting the first activation function information and the fourth activation function information to the activation function generating module, and control the neural network model to change the activation function information used in the neural network model from the third activation function information to the fifth activation function information.

In accordance with another aspect of the disclosure, a method of controlling an electronic apparatus is provided. The method includes storing a neural network model, an activation function generating module that generates activation function information used in the neural network model, first activation function information, second activation function information, and third activation function information generated based on the first activation function information and the second activation function information, and receiving fourth activation function information from an external device through a communicator of the electronic apparatus, based on type information on the fourth activation function information corresponding to the second activation function information, generating fifth activation function information by inputting the first activation function information and the fourth activation function information to the activation function generating module, and controlling the neural network model to change the activation function information used in the neural network model from the third activation function information to the fifth activation function information.

In accordance with another aspect of the disclosure, a non-transitory computer readable recording medium including a program for executing a method of an electronic apparatus, is provided. The method includes storing a neural network model, an activation function generating module that generates activation function information used in the neural network model, first activation function information, second activation function information, and third activation function information generated based on the first activation function information and the second activation function information, receiving fourth activation function information from an external device through a communicator of the electronic apparatus, based on type information on the fourth activation function information corresponding to the second activation function information, generating fifth activation function information by inputting the first activation function information and the fourth activation function information to the activation function generating module, and controlling the neural network model to change the activation function information used in the neural network model from the third activation function information to the fifth activation function information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
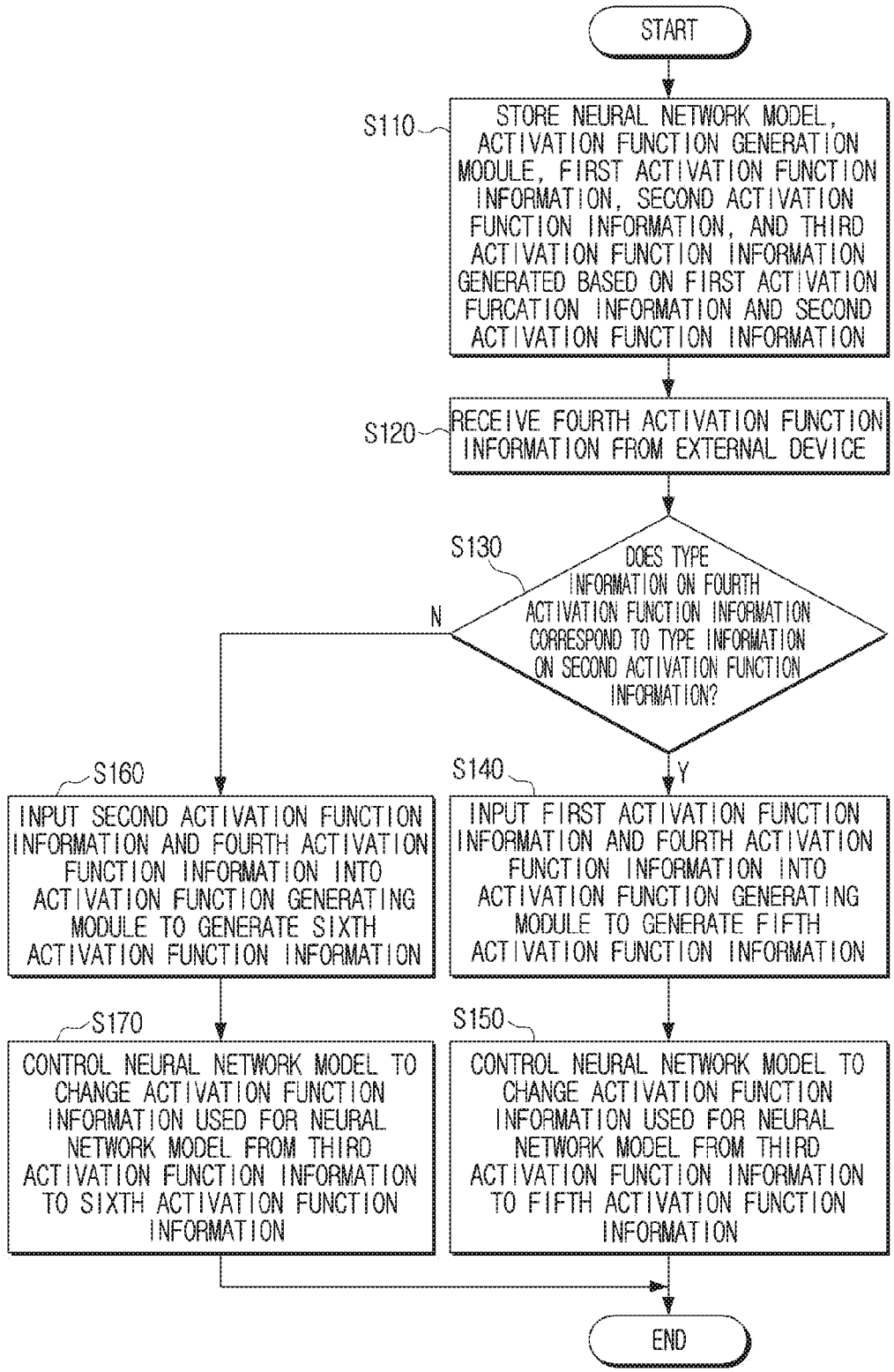
FIG. 1 is a flowchart schematically illustrating a method of controlling an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", and "may include" used in the embodiments of the disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

On the other hand, when an element (e.g., a first element) is "directly coupled with/to" or "directly connected to" another element (e.g., a second element), an element may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level.

Under certain circumstances, the term "device configured to" may refer to "device capable of" doing something together with another device or components. For example, "a sub-processor configured (or configured to) perform A, B, and C" may refer to a generic-purpose processor (e.g., central processing unit (CPU) or an application processor) capable of performing corresponding operations by executing a dedicated processor (e.g., an embedded processor) or one or more software programs stored in a memory device to perform the operations.

In the embodiments disclosed herein, a term 'module' or 'unit' refers to an element that performs at least one function or operation. The 'module' or 'unit' may be realized as hardware, software, or combinations thereof. In addition, a plurality of 'modules' or 'units' may be integrated into at least one module and may be realized as at least one processor in an integrated manner except for 'modules' or 'units' that should be realized in specific hardware.

Further, various elements and areas in the drawings are schematically drawn. Therefore, the technical ideas are not limited by a relative size or interval drawn in the accompanying drawings.

For example, the electronic apparatus may be implemented as various electronic devices including, for example, and without limitation, a smartphone, a tablet personal computer (PC), a desktop PC, a laptop PC, a wearable device, or the like. According to another embodiment, the electronic apparatus 100 may be implemented as a device receiving a photographed image of the video wall from an external camera and obtaining layout information of the video wall from the received image. Wearable devices may include at least one of accessories (e.g. watches, rings, bracelets, anklets, necklaces, glasses, contact lenses, or head-mounted-devices (HMD)), fabrics or clothing (e.g. electronic clothing), a body attachment type (e.g., a skin pad or a tattoo), or a bio-implantable circuit.

In addition, according to an embodiment, the methods according to various embodiments described above may include at least one of a television, a digital video disk (DVD) player, audio, refrigerator, air conditioner, cleaner, oven, microwave, washing machine, air purifier, set top box, home automation control panel, security control panels, media boxes (e.g., the Samsung HomeSync™, Apple the TV™, or Google the television (TV)™), a game console (e.g., Xbox™, the PlayStation™s), electronic dictionaries, electronic keys, cameras, or a digital photo frame.

In another embodiment, the electronic apparatus may include at least one of various medical devices (e.g., various portable medical measurement devices (such as a blood glucose meter, heart rate monitor, blood pressure meter, body temperature meter, etc.), magnetic resonance angiography (MRA), magnetic resonance imaging (MRI), computed tomography (CT), camera, or ultrasound, etc.), navigation device, global navigation satellite system (GNSS), event data recorder (EDR), flight data recorder (FDR), automotive infotainment device, marine electronic equipment (e.g., navigational devices for ships, gyro compasses, etc.), avionics, security devices, head units for vehicles, industrial or household robots, drones, automated teller machines (ATMs) in financial institutions, point-of-sale (POS) for stores sales, or Internet of Things devices (e.g., light bulbs, various sensors, sprinkler devices, fire alarms, thermostats, street lights, toasters, exercise equipment, hot water tanks, heaters, boilers, etc.).

The example embodiments of the disclosure will be described in greater detail below in a manner that will be understood by one of ordinary skill in the art.

FIG. 1 is a flowchart schematically illustrating a method of controlling an electronic apparatus according to an embodiment of the disclosure.

Referring to FIG. 1, before describing each step of the method of controlling, key terms used in describing the disclosure will be described. The "electronic apparatus" according to the disclosure may be implemented as a user terminal such as a smartphone, a tablet PC, or the like, or may be implemented as a server for providing a service related to a neural network model. In other words, an electronic apparatus configured to obtain an activation function used in the neural network model according to the disclosure may correspond to the electronic apparatus of the disclosure regardless of its type.

The "neural network model" refers to an artificial intelligence model including an artificial neural network, and may be learned by deep learning. Specifically, the neural network model may include at least one of deep neural network (DNN), convolution neural network (CNN), recurrent neural network (RNN), or genetic adversarial networks (GAN). However, the neural network model according to the disclosure is not limited thereto.

The "activation function" refers to a function that determines whether to activate output values of previous layers in the neural network model and generates output values. Specifically, in a feedforward process of acquiring the output value while transmitting an input value from an input layer to an output layer, the activation function may determine whether to transmit the input value transmitted from the previous layers to the next layers, and, if so, to which output value will be converted and transmitted. In particular, a non-linear function is mainly used as an activation function. Accordingly, in the process that the activation function transmits the input value transmitted from the previous layer to the next layer, a non-linearity may be given to the neural network model, so that the neural network model may be deeply implemented. Meanwhile, a gradient of the activation function may be used to update weight values (parameter) of each layer included in the neural network model in a backpropagation process for training the neural network model.

Examples of the activation function may be various such as sigmoid function, hyperbolic tangent function, rectified linear unit (ReLU) function, exponential linear unit (ELU) function, gaussian error linear unit (GELU) function, swish function, or the like. The activation functions according to the disclosure is not limited to a specific kind of activation function.

Meanwhile, the activation function is processed in the form of data or information in the electronic apparatus and neural network model according to the disclosure. Therefore, the term "activation function information" is used as a term for referring to data or information about the activation function. Specifically, terms such as first activation function information, second activation function information, third activation function information, fourth activation function information, fifth activation function information, and sixth activation function information, respectively, are to specify data or information for a first activation function, a second activation function, a third activation function, a fourth activation function, a fifth activation function, and a sixth activation function, respectively.

Hereinafter, each step of the control method according to the disclosure will be described with reference to FIG. 1. Referring to FIG. 1, the electronic apparatus may store a neural network model, an activation function generating module that generates activation function information used for the neural network model, first activation function information, second activation function information, and third activation function information generated based on the first activation function information and the second activation function information in a memory S110. Also, using the third activation function information may refer to performing a learning process and an inference process of the neural network model by using the third activation function as an activation function between hidden layers included in the neural network model.

In describing the disclosure, the term "first activation function" is used to specify one activation function, which has a relatively higher calculation speed than the second activation function, but has less learning performance, and the term "second activation function" is used to specify one activation function that has a relatively high learning performance compared to the first activation function, but has a relatively low calculation speed. For example, the first activation function may refer to a ReLU function, which is an activation function having a relatively high operation speed, and the second activation function may refer to a GELU function, which is an activation function having a relatively high learning performance. Meanwhile, the term "third activation function" is used to specify an activation function generated based on the first activation function information and the second activation function information.

Meanwhile, the first activation function information, the second activation function information, and the third activation function information may be stored and provided in a memory during a manufacturing process of the electronic apparatus. Also, the first activation function information, the second activation function information, and the third activation function information may be received from an external device and stored through a communicator. In other words, the third activation function information may be generated in an external device based on the first activation function and the second activation function, and be transmitted to the electronic apparatus. In addition, the first activation function information and the second activation function information may be received from a server through a communicator, and the third activation function information may be acquired by inputting the first activation function information and the second activation function information into the activation function generating module.

The electronic apparatus may receive the fourth activation function information from the external device through the communicator S120. The term "fourth activation function" is used to specify an activation function different from the first activation function, the second activation function, and the third activation function. In particular, the fourth activation function may be a new activation function having a higher calculation speed than the first activation function, or a new activation function having better learning performance than the second activation function. However, the external device may be implemented as a server, but the disclosure is not limited thereto.

When the fourth activation function information is received, the electronic apparatus may identify an activation function information corresponding to the fourth activation function information among the first activation function information and the second activation function information. Specifically, the electronic apparatus may identify whether the type information on the fourth activation function information corresponds to type information on the second activation function information S130.

The "type information" may include at least one of information on a calculation speed when the activation function is used in the neural network model or information on learning performance when the activation function is used in the neural network model. Specifically, the electronic apparatus may identify whether a specific activation function is an activation function having a relatively higher calculation speed than the other activation functions, or whether the specific activation function is an activation function having relatively high learning performance based on type information on each activation function.

Further, the type information may be received together with activation function information from an external device. For example, the external device may perform a learning process of the neural network model based on the fourth activation function, and thus acquire at least one of information on a calculation speed or information on a learning performance. Thereafter, the external device may transmit type information including at least one of information on the calculation speed of the fourth activation function or information on the learning performance of the fourth activation function to the electronic apparatus, in the form of metadata, along with the fourth activation function information. Then, the electronic apparatus may receive the fourth activation function information and type information thereof from the external device, and identify whether the fourth activation function information corresponds to the first activation function or the second activation function stored in the memory based on the received type information.

When the activation function information corresponding to the fourth activation function information is identified among the first activation function information and the second activation function information, the electronic apparatus may replace the activation function information identified to be corresponded to the fourth activation function to the fourth activation function information, and acquire a new activation function using the activation function identified not to be corresponded to the fourth activation function together with the fourth activation function information. In addition, the electronic apparatus may control the neural network model to change (update) the activation function information used in the neural network model to new activation function information.

Specifically, when the type information on the fourth activation function information corresponds to the type information on the second activation function information S130-Y, the electronic apparatus may input the first activation function information and the fourth activation function information into the activation function generating module, and generate the fifth activation function information S140, and control the neural network model to change the third activation function information of the activation function information used to the neural network model to the fifth activation function information thereof S150. The term "fifth activation function" is to specify activation function information generated based on first activation function information and fourth activation function information.

On the contrary, when the type information on the fourth activation function information corresponds to the type information on the first activation function information S130-N, the electronic apparatus may input the second activation function information and the fourth activation function information into the activation function generating module to generate the sixth activation function information S160, and control the neural network model to change the third activation function information of the activation function information used to the neural network model to the sixth activation function information thereof S170. The term "sixth activation function" is to specify activation function information generated based on second activation function information and fourth activation function information.

Meanwhile, a process of generating new activation function information based on one activation function information among the first activation function information and the second activation function information, and the fourth activation function information may be performed through a calculation process as described below. Hereinafter, a meaning of each term included in the fifth activation function and a meaning of each calculation process for generating the fifth activation function will be described in detail with reference to FIG. 2 together with Equations 1 to 6.

Figure 2:
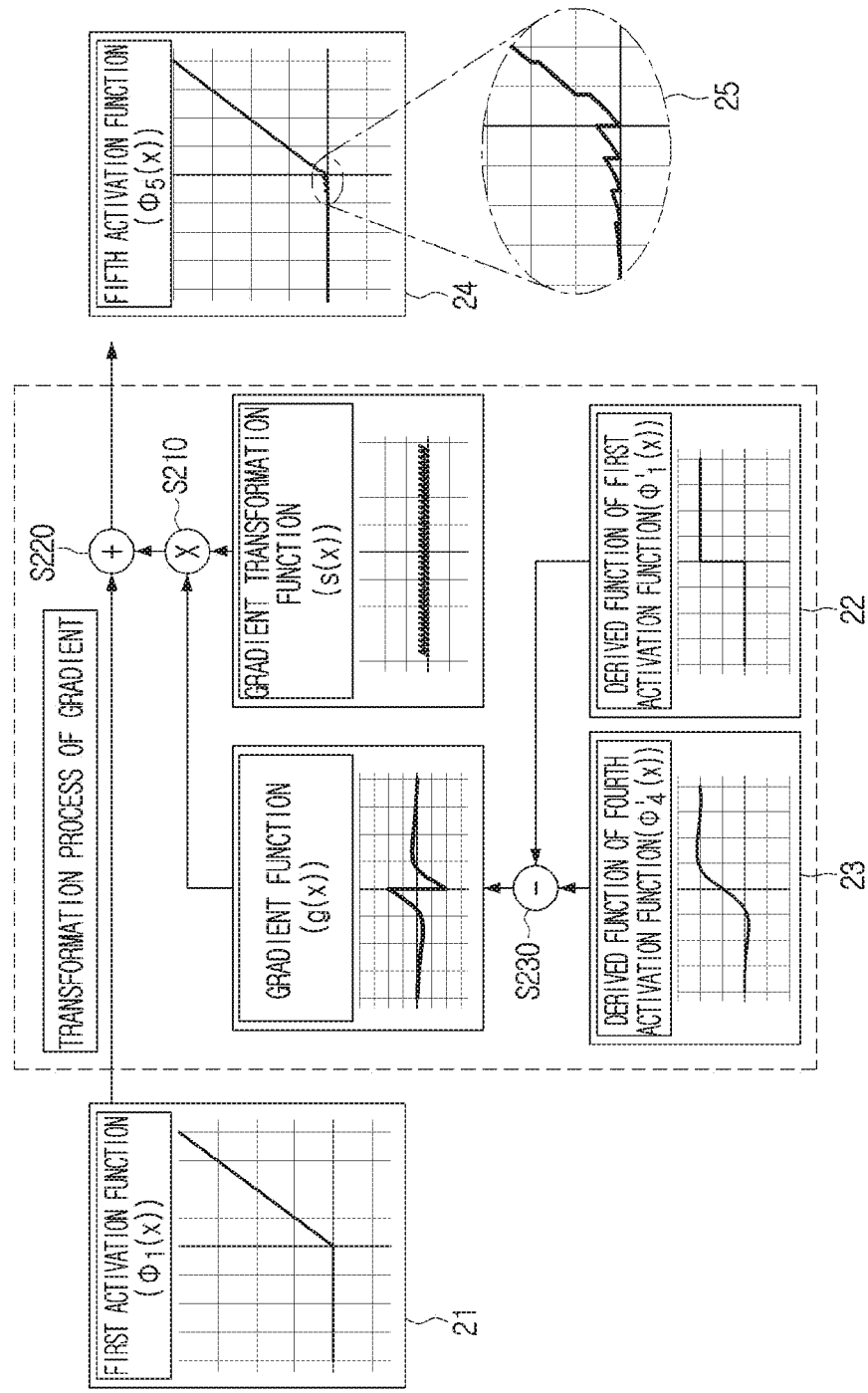
FIG. 2 is a view illustrating a process of generating a fifth activation function information based on first activation function information and fourth activation function information according to an embodiment of the disclosure.

FIG. 2 is a view illustrating a process of generating a fifth activation function information based on first activation function information and fourth activation function information according to an embodiment of the disclosure.

Referring to FIG. 2, the first activation function ($\phi_1(x)$) may be a ReLU function. As shown in Graph 21 of FIG. 2, the ReLU function is an activation function that if an input value transmitted from previous layers is negative, the ReLU outputs 0, and if an input value transmitted from pervious layers is positive, the ReLU outputs the transmitted input value as it is. However, referring to the graph 22 of FIG. 2, when the input value is negative, the ReLU function transmits a gradient of 0 during backpropagation, which may affect learning of the neural network model (so-called dying ReLU problem). Meanwhile, the fourth activation function ($\phi_4(x)$) may be a GELU function. Referring to the graph 23 of FIG. 2, the GELU function has more meaningful gradient in all sections than the ReLU function, and thus the GELU function has better learning performance than the ReLU function. Hereinafter, the disclosure will be described under an assumption that the first activation function ($\phi_1(x)$) according to the disclosure is the ReLU function, and the fourth activation function ($\phi_4(x)$) is the GELU function.

As illustrated in the Equation 1 below, the fifth activation function ($\phi_5(x)$) may be generated by adding a value that gradient function (g(x)) multiplied by gradient transform function (s(x)) S210 to the first activation function S220.

$$\phi_5(x)=\phi_1(x)+s(x)g(x) \quad \text{Equation 1}$$

Referring to Equation 2 and FIG. 2 below, the "gradient function (g(x))" may be obtained by subtracting a first activation derived function ($\phi'_1(x)$) from a fourth activation derived function ($\phi'_4(x)$) S230. In addition, the gradient function (g(x)) may be reflected in the gradient of the fifth activation function ($\phi_5(x)$) as described below with reference to Equations 5 and 6. In other words, a difference of gradient in which the gradient of the first activation function ($\phi_1(x)$) is subtracted from the gradient of the fourth activation function ($\phi_4(x)$) may be reflected in the gradient of the fifth activation function ($\phi_5(x)$).

$$g(x)=\phi'_4(x)-\phi'_1(x) \quad \text{Equation 2}$$

Referring to Equation 3 and FIG. 2 below, the "gradient transform function (s(x))" may be a function in the form of a greatest integer function (floor function). However, it is not limited thereto, and the gradient transformation function (s(x)) may be implemented as various functions including a step function form. When the gradient transformation function (s(x)) is implemented as the greatest integer function of Equation 3, a function value of the gradient transform function (s(x)) is always less than 1/K, and a gradient of the gradient transformation function (s(x)) is always 1 in a differentiable section.

$$s(x) = \frac{Kx - [Kx]}{K} \quad \text{Equation 3}$$

Since a function value of the gradient transformation function (s(x)) is always less than 1/K, if K is sufficiently large, a function value of the fifth activation function ($\phi_5(x)$) may be approximated to a function value of the first activation function ($\phi_1(x)$) as shown in Equation 4 below. In other words, if the K value is set to a sufficiently large value, the neural network model may use the fifth activation function ($\phi_5(x)$) approximating the first activation function ($\phi_1(x)$) in the feedforward process, thereby increasing a calculation speed of the neural network model to a close level when using the first activation function ($\phi_1(x)$).

$$\phi_5(x) \approx \phi_1(x) \quad \text{Equation 4}$$

A derived function of the fifth activation function ($\phi'_5(x)$) is shown as the Equation 5 below. However, as described above, in the differentiable section, the gradient of the gradient transformation function (s(x)) is always 1, and when K is sufficiently large, the function value of the gradient transformation function (s(x)) is close to 0. Accordingly, as shown in Equation 6 below, the derived function of the fifth activation function ($\phi'_5(x)$) approximates a value obtained by adding the gradient function (g(x)) to the derived function of the first activation function ($\phi'_1(x)$)). In other words, if the K value is set to a sufficiently large value, the neural network model may update a weight value of each layer included in the neural network model based on the gradient reflecting the features of the gradient of the fourth activation function ($\phi_4(x)$), thereby improving a learning performance of the neural network model to a degree close to the case of using the fourth activation function ($\phi_4(x)$).

$$\phi'_5(x) \approx \phi'_1(x)+s'(x)g(x)+s(x)g'(x) \quad \text{Equation 5}$$

$$\phi'_5 \approx \phi'_1(x)+g(x) \quad \text{Equation 6}$$

According to the descriptions with reference to Equations 4 and 6, the fifth activation function ($\phi_5(x)$) is an activation function obtained by transforming the gradient of the first activation function ($\phi_1(x)$) based on the fourth activation function ($\phi_4(x)$), and shows a feature close to the first activation function ($\phi_1(x)$) while the neural network model performs in the feedforward process, and shows a feature in which the feature of the fourth activation function ($\phi_4(x)$) is reflected while the neural network model performs in the backpropagation process. In other words, as shown in FIG. 2, the fifth activation function ($\phi_5(x)$) has a function value close to the function value of the first activation function ($\phi_1(x)$), and represents the forms 24 and 25 capable of delivering the meaningful gradient in the backpropagation process since the gradient of the fourth activation function ($\phi_4(x)$) is reflected.

As described above, the K value may need to be set to a value large enough to approximate the function value of the gradient transformation function (s(x)). For example, it may be preferable that the K value exceeds $10^5$. Meanwhile, an upper limit of the K value may be determined within a range in which meaningful calculation is possible without overflow. For example, the K value may be less than $10^{305}$, but the disclosure is not limited thereto.

In the above, the calculation processes as described above with reference to Equations 1 to 6 and FIG. 2 are not limited to the above examples, and may be applied to a process of generating new activation function information based on two different activation function information according to the disclosure.

According to an embodiment of the disclosure as described above with reference to FIGS. 1 and 2, the electronic apparatus may generate a new activation function with a high calculation speed and excellent learning performance, and train the neural network model based on an activation function with a relatively high calculation speed and an activation function with a relatively high learning performance.

In addition, the electronic apparatus may efficiently update the existing activation function information based on the latest activation function information, and continuously improve the performance of the neural network model. In particular, when the electronic apparatus according to the disclosure is implemented in the form of an on-device including a neural network model, the electronic apparatus may generate the activation function with the high calculation speed and high learning performance using the activation function information received from an external device without transmitting sensitive information related to the privacy of the user to the external device, such that the electronic apparatus may improve performance of the neural network model.

Figure 3:
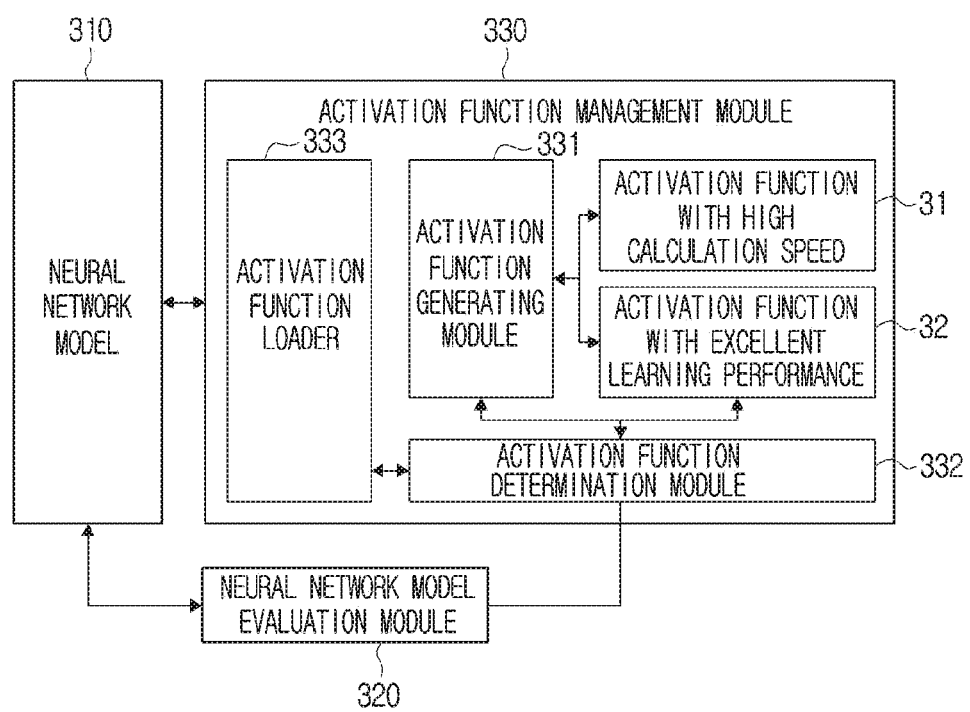
FIG. 3 is a view illustrating an architecture of a software module according to an embodiment of the disclosure.

FIG. 3 is a view illustrating an architecture of a software module according to an embodiment of the disclosure.

Referring to FIG. 3, the software module according to an embodiment of the disclosure may include a neural network model 310, a neural network model evaluation module 320, and an activation function management module 330.

As described above, the neural network model 310 is an artificial intelligence model including an artificial neural network, and may use an activation function in performing a learning process and an inference process. Specifically, the activation function may determine whether to transmit input values transmitted from the previous layers to the next layers, and if so, to which output value will be converted and transmitted, and a gradient of the activation function may be used to update weight values (parameter) of each layer included in the neural network model 310.

The neural network model evaluation module 320 refers to a module that obtains evaluation information related to the learning performance of the neural network model 310. Specifically, the neural network model evaluation module 320 may obtain information about how many epochs the neural network model 310 has been trained, that is, how many times the entire training data has been trained. The neural network model evaluation module 320 may obtain information on loss during the learning process. In addition, the neural network model evaluation module 320 may evaluate the neural network model 310 using a validation data set that is constructed separately from the training data set. Meanwhile, the neural network model evaluation module 320 may transmit the obtained evaluation information to an activation function determination model.

The activation function management module 330 collectively refers to a module that manages operations related to activation function information, and may include an activation function generating module 331, an activation function determination module 332, and an activation function loader 333 as illustrated in FIG. 3.

The activation function generating module 331 refers to a module that generates new activation function information based on two different activation function information. In particular, as described above with reference to FIGS. 1 and 2, the activation function generating module 331 may generate new activation function information with high calculation speed and high learning performance based on activation function information with a relatively high calculation speed 31 and the activation function information with relatively excellent learning performance 32. In addition, although not shown in FIG. 3, the generated new activation function information may also be stored in the memory, like the activation function information with the high calculation speed 31 and the activation function information with excellent learning performance 32. The detailed calculation process performed by the activation function generating module 331 has been described above with reference to FIGS. 1 and 2, so overlapping descriptions will be omitted.

The activation function determination module 332 refers to a module for determining activation function information to be used by the neural network model 310 among a plurality of activation function information. In particular, the activation function determination module 332 may determine an activation function information used in the neural network model 310 among the activation function information generated by the activation function generating module 331 and the activation function information with calculation speed 31 based on the evaluation information received from the neural network model evaluation module 320.

According to an embodiment, the activation function determination module 332 may determine activation function information generated by the activation function generating module 331 as activation function information to be used in the neural network model 310. Thereafter, if at least one predetermined condition to stop learning is satisfied while the learning process of the neural network model 310 is performed using the activation function information generated by the activation function generating module 331, the activation function determination module 332 may determine to replace the activation function information which will be used in the neural network model 310 to the activation function information with high calculation speed 31 in the activation function information generated by the activation function generating module 331.

In other words, as a result of performing the learning process of the neural network model 310 using a new activation function having high learning speed and excellent learning performance, if it is identified that the learning process is sufficiently performed to stop the learning process of the neural network model 310, the activation function determination module 332 may determine to replace the activation function information which will be used in the neural network model 310 in order to perform an inference process of the neural network model 310 using the activation function information having higher calculation speed than the activation function generated by the activation function generating module 331.

A detailed example of at least one predetermined condition to stop learning, and the replacement the activation function information used in the neural network model 310 to the other activation function information will be described in detail with reference to FIG. 4.

An activation function loader 333 refers to a module that loads the activation function information determined by the activation function determination module 332 into the neural network model 310. Specifically, if a request to load the determined activation function is received from the activation function determination module 332, the activation function loader 333 may load the determined activation function information into the neural network model 310. Then, when the activation function information determined by the activation function loader 333 is loaded, the neural network model 310 may perform a learning process and an inference process using the loaded activation function information.

In the above, software modules according to an embodiment of the disclosure have been described with reference to FIG. 4, but this is only for describing the disclosure in more detail, and is not limited thereto. In other words, the software modules according to the disclosure may be implemented with an architecture that does not include at least one of the software modules as illustrated in FIG. 4 or further includes at least one module different from the software module of FIG. 4.

Figure 4:
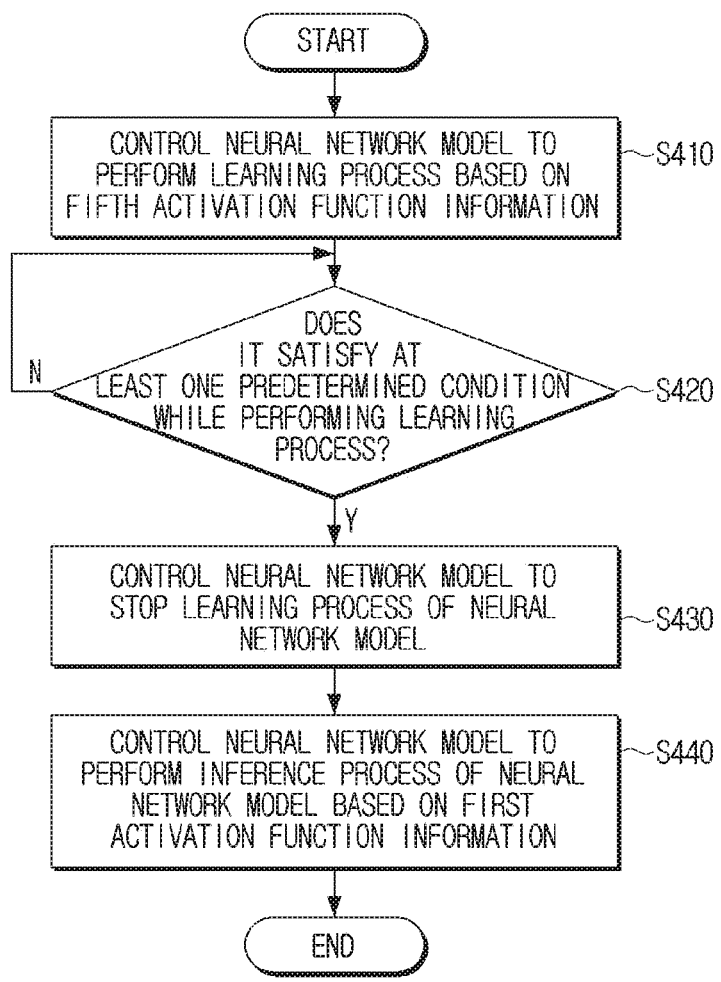
FIG. 4 is a flowchart illustrating an embodiment relating to replacing activation function information used in a current neural network model with the other activation function information according to an embodiment of the disclosure.

FIG. 4 is a flowchart illustrating an embodiment relating to replacing activation function information used in a current neural network model with the other activation function information according to an embodiment of the disclosure.

Referring to FIG. 4, as described above with reference to FIGS. 1 and 2, it is described under an assumption that the fifth activation function information is generated based on the first activation function information having a high calculation speed and the fourth activation function information having excellent learning performance. If the fifth activation function information is generated based on the first activation function information and the fourth activation function information, the electronic apparatus may control the neural network model to perform learning process based on the fifth activation function information S410. The operation of performing learning process based on the fifth activation function information may refer to transmitting a function value of the fifth activation function information from input layers to output layers in the feedforward process to acquire output values, and transmitting a gradient of the fifth activation function information from the output layers to the input layers in acquires an output value in the backpropagation process to update weight values of each layer included in the neural network mode. The method of machine learning used in the training process of the neural network model according to the disclosure may include methods of supervised learning, unsupervised learning, and reinforcement learning.

While the learning process of the neural network model is performed based on the fifth activation function information, the electronic apparatus may identify whether at least one predetermined condition to stop learning is satisfied S420. The predetermined at least one condition to stop learning may include at least one of the cases that the training of the neural network model has progressed beyond a predetermined number of epochs, a loss of the neural network model has reached a predetermined threshold value or less, the neural network model has saturated, or the performance of the neural network model measured based on the data set is above a predetermined criterion or more. In describing the disclosure, being able to be "predetermined" means that it may be changed by the electronic apparatus or setting done by the user.

If at least one predetermined condition to stop learning is not satisfied while the learning process of the neural network model is performed based on the fifth activation function information S420-N, the electronic apparatus may identify whether at least one predetermined condition to stop learning is satisfied. The operation of identifying whether at least one predetermined condition to stop learning is satisfied may be performed at a predetermined time interval, and the predetermined time interval may be changed by an electronic apparatus or the user's setting.

If at least one preset condition to stop learning is satisfied while the learning process of the neural network model is performed based on the fifth activation function information S420-Y, the electronic apparatus may control the neural network model to stop the learning process of the neural network model S430, and control the neural network model to perform an inference process of the neural network model based on the first activation function information S440. Performing the inference process based on the first activation function information means that an output value is acquired by transmitting the function value of the first activation function information from the input layer to the output layer in the feedforward process.

As described above, by using the fifth activation function, the learning performance of the neural network model may be improved to a degree close to the case of using the fourth activation function, and the calculation speed of the neural network model may be improved to a degree close to the case of using the first activation function. However, the calculation speed when using the fifth activation function is merely close to that of using the first activation function, and may be slower than that of the first activation function. Therefore, it is preferable to perform the inference process of the neural network model by using the first activation function information which has a faster calculation after the learning performance is sufficiently performed.

In conclusion, according to the embodiment as described above with reference to FIG. 4, the electronic apparatus may perform the learning process of the neural network model by using the fifth activation function having high learning speed and excellent learning performance, and after the learning process is sufficiently performed, perform the inference process of the neural network model using the first activation function information which has a higher calculation speed, even though its learning performance is inferior, compared to the fifth activation function.

Figure 5:
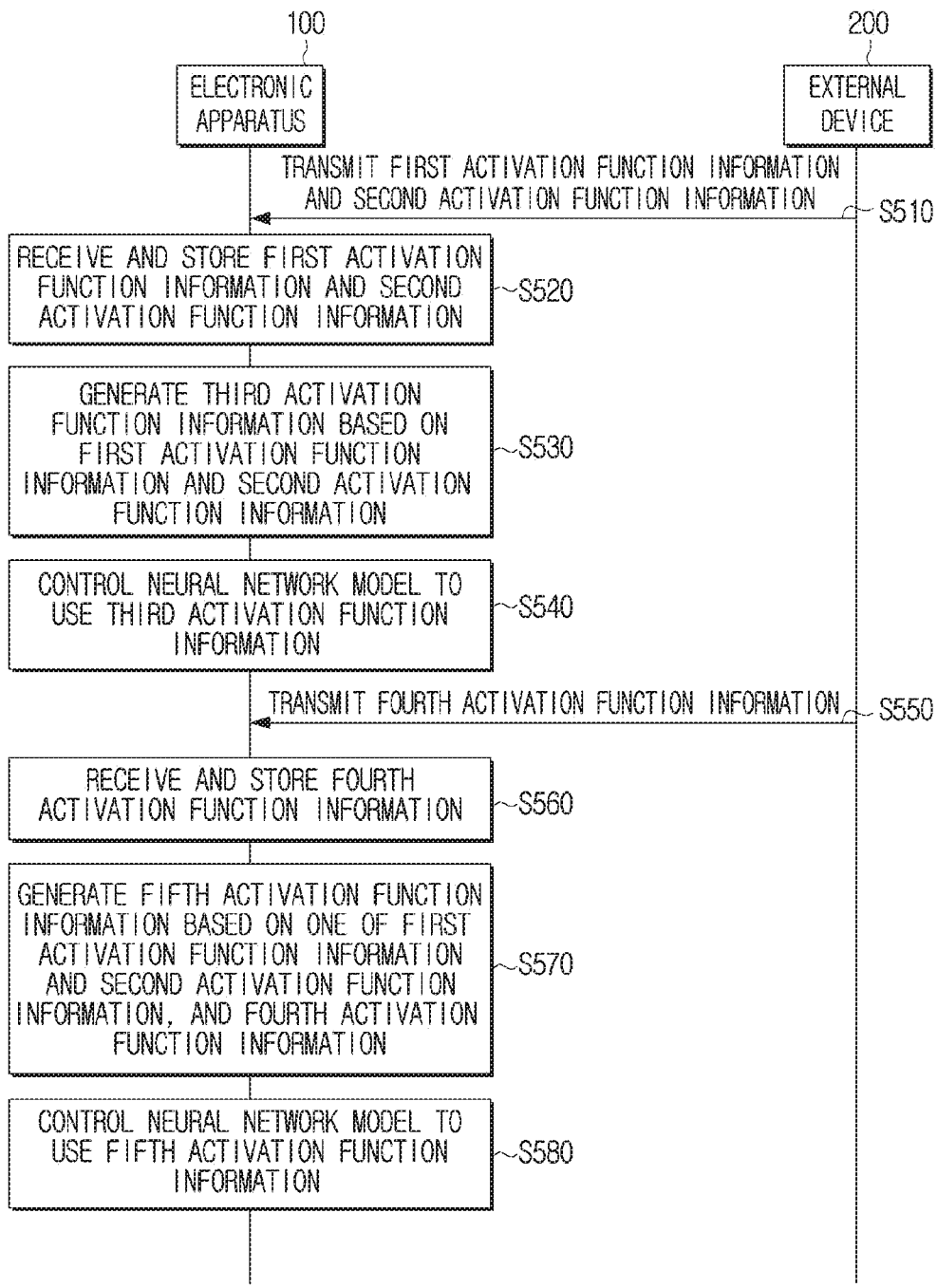
FIG. 5 is a sequence diagram illustrating an embodiment of generating third activation function information and fifth activation function information in an electronic apparatus according to an embodiment of the disclosure.
Figure 6:
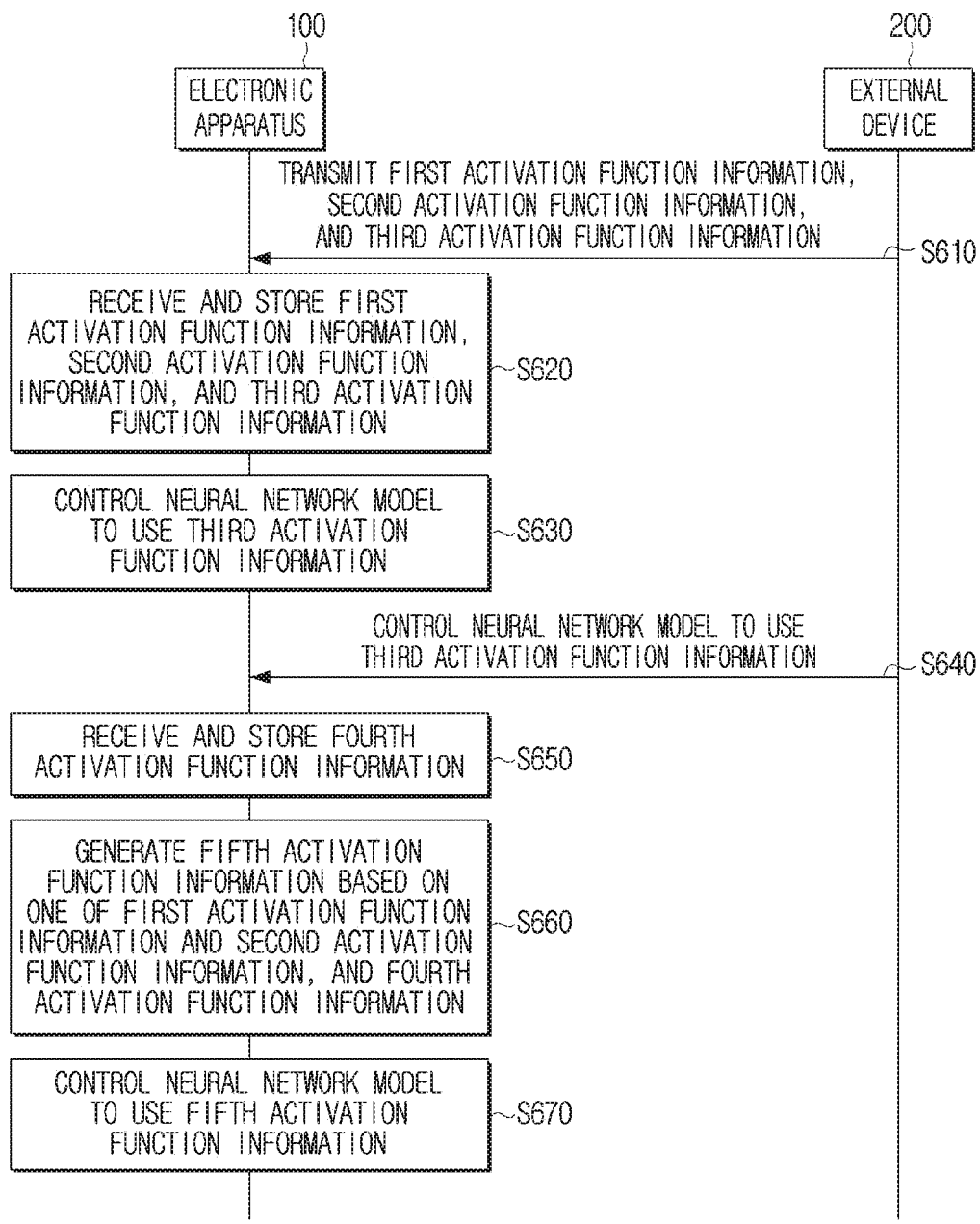
FIG. 6 is a sequence diagram illustrating an embodiment of generating third activation function information in an external device and generating fifth activation function information in an electronic apparatus according to an embodiment of the disclosure.
Figure 7:
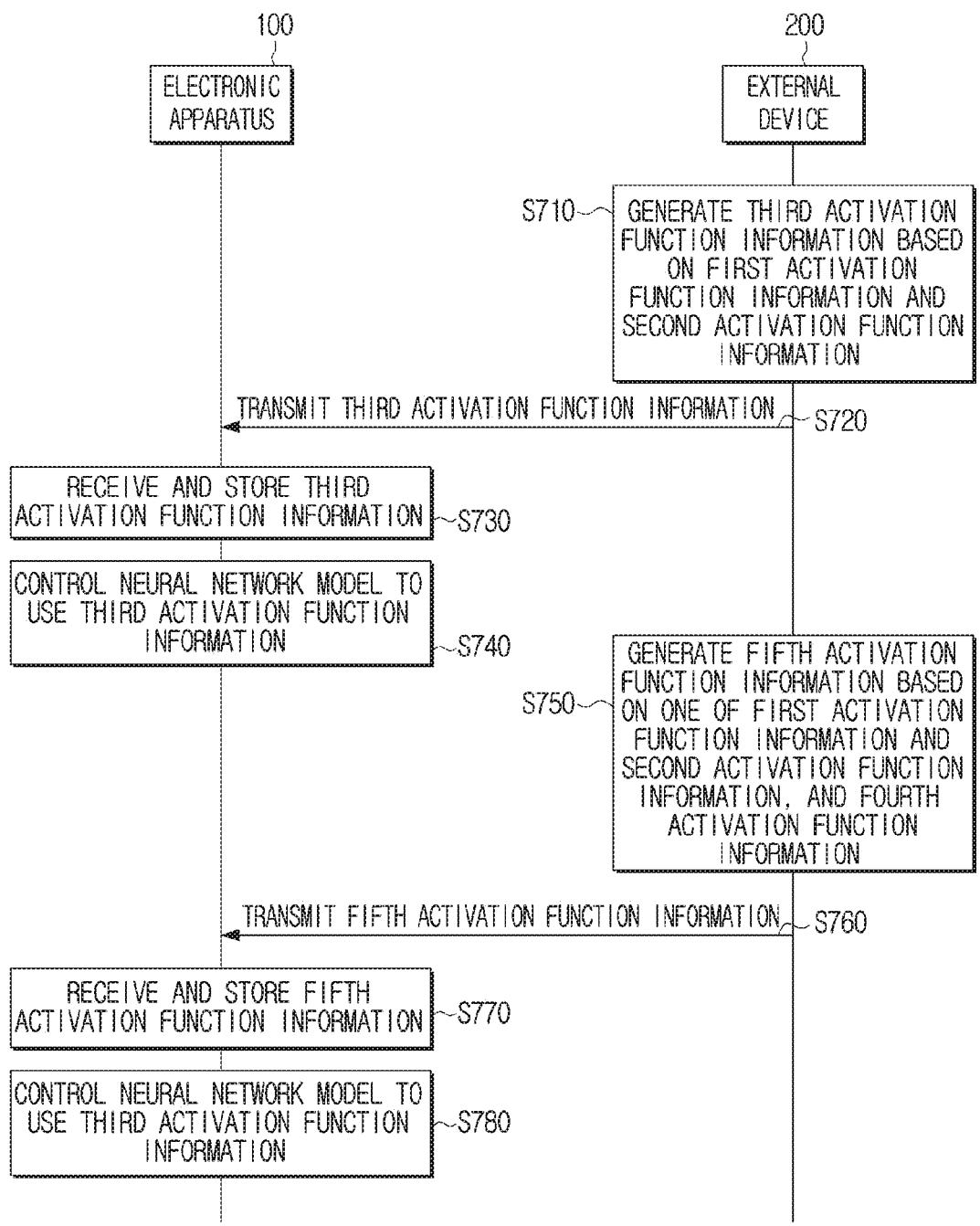
FIG. 7 is a sequence diagram illustrating an embodiment of generating third activation function information and fifth activation function information in an external device according to an embodiment of the disclosure.

FIGS. 5 to 7 are sequence diagrams illustrating various embodiments that are classified according to whether a subject generating the third activation function information and the fifth activation function information is an electronic apparatus or an external device.

FIGS. 1 and 2 have been described on the premise that the first activation function information, the second activation function information, and the third activation function information are stored in the memory of the electronic apparatus 100. However, the third activation function information may not only be stored in the memory in the process of manufacturing the electronic apparatus 100, but also be received from the external device 200 or may be generated by the electronic apparatus 100. Meanwhile, FIGS. 1 and 2 described the embodiment that the electronic apparatus 100 may receive the fourth activation function information from the external device 200, and generate and acquire the fifth activation information based on the first activation function information and the fourth activation function information. However, according to another embodiment of the disclosure, the external device 200 may generate fifth activation function information based on the first activation function information and the fourth activation function information, and the electronic apparatus 100 may receive the fifth activation function from the external device 200 to acquire the fifth activation function information.

Accordingly, hereinafter, with reference to FIGS. 5 to 7, various embodiments of the disclosure are divided based on whether the subject generating the third activation function information and the fifth activation function information is based on whether the electronic apparatus 100 or the external device 200 is used. However, in the following description of FIGS. 5 to 7, redundant description provided above will be omitted in the description of FIGS. 1 and 2.

FIG. 5 is a sequence diagram illustrating an embodiment of generating third activation function information and fifth activation function information in an electronic apparatus according to an embodiment of the disclosure.

Referring to FIG. 5, the external device 200 may transmit the first activation function information and the second activation function information to the electronic apparatus 100 S510. Accordingly, the electronic apparatus 100 may receive the first activation function information and the second activation function information from the external device 200 to store them in the memory S520. Thereafter, the electronic apparatus 100 may generate third activation function information based on the first activation function information and the second activation function information S530. Then, the electronic apparatus 100 may control the neural network model to use the third activation function information S540.

Meanwhile, the external device 200 may transmit the fourth activation function information to the electronic apparatus 100 S550, and accordingly, the electronic apparatus 100 may receive the fourth activation function information and store it in the memory S560. Thereafter, the electronic apparatus 100 may generate the fifth activation function information based on one of the first activation function information and the second activation function information, and the fourth activation function information S570. Then, the electronic apparatus 100 may control the neural network model to use the fifth activation function information S580. In other words, the electronic apparatus 100 may control the neural network model to change the activation function information used in the neural network model from the third activation function information to the fifth activation function information.

FIG. 6 is a sequence diagram illustrating an embodiment of generating third activation function information in an external device and generating fifth activation function information in an electronic apparatus according to an embodiment of the disclosure.

Referring to FIG. 6, the external device 200 may transmit the first activation function information, the second activation function information, and the third activation function information to the electronic apparatus 100 S610, and accordingly, the electronic apparatus may receive the first activation function information, the second activation function information, and the third activation function information from the external device 200 and store them in the memory S620. Thereafter, the electronic apparatus 100 may control the neural network model to use the third activation function information S630.

Meanwhile, the external device 200 may transmit the fourth activation function information to the electronic apparatus 100 S640, and accordingly, the electronic apparatus 100 may receive the fourth activation function information and store it in the memory S650. Thereafter, the electronic apparatus 100 may generate the fifth activation function information based on one of the first activation function information and the second activation function information, and the fourth activation function information S660. The electronic apparatus 100 may control the neural network model to use the fifth activation function information S670.

Meanwhile, the description of FIG. 6 has been described on the premise that the first activation function information and the second activation function information are received from the external device 200 together with the third activation function information, but the first activation function information and the second activation function information may be received from the external device 200 together with the fourth activation function information.

FIG. 7 is a sequence diagram for explaining an embodiment in which the third activation function information and the fifth activation function information are generated by the external device 200 according to an embodiment of the disclosure.

FIG. 7 is a sequence diagram illustrating an embodiment of generating third activation function information and fifth activation function information in an external device.

Referring to FIG. 7, the external device 200 may generate the third activation function information based on the first activation function information and the second activation function information S710. The external device 200 may transmit the third activation function information to the electronic apparatus 100 S720, and accordingly, the electronic apparatus 100 may receive the third activation function information and store it in the memory S730. Thereafter, the electronic apparatus 100 may control the neural network model to use the third activation function information S740.

Meanwhile, the external device 200 may generate the fifth activation function information based on one of the first activation function information and the second activation function information, and the fourth activation function information S750. The external device 200 may transmit the fifth activation function information to the electronic apparatus 100 S760, and accordingly, the electronic apparatus 100 may receive the fifth activation function information and store it in the memory S770. Thereafter, the electronic apparatus 100 may control the neural network model to use the fifth activation function information S780.

Meanwhile, the description above has been described on the premise that there is only one external device 200 that transmits activation function information to the electronic apparatus 100, but external devices 200 that transmit activation function information to the electronic apparatus 100 are plural. For example, the electronic apparatus 100 may receive the third activation function information from a first external device 200, and then receive the fifth activation function from a second external device 200 different from the first external device 200.

Figure 8:
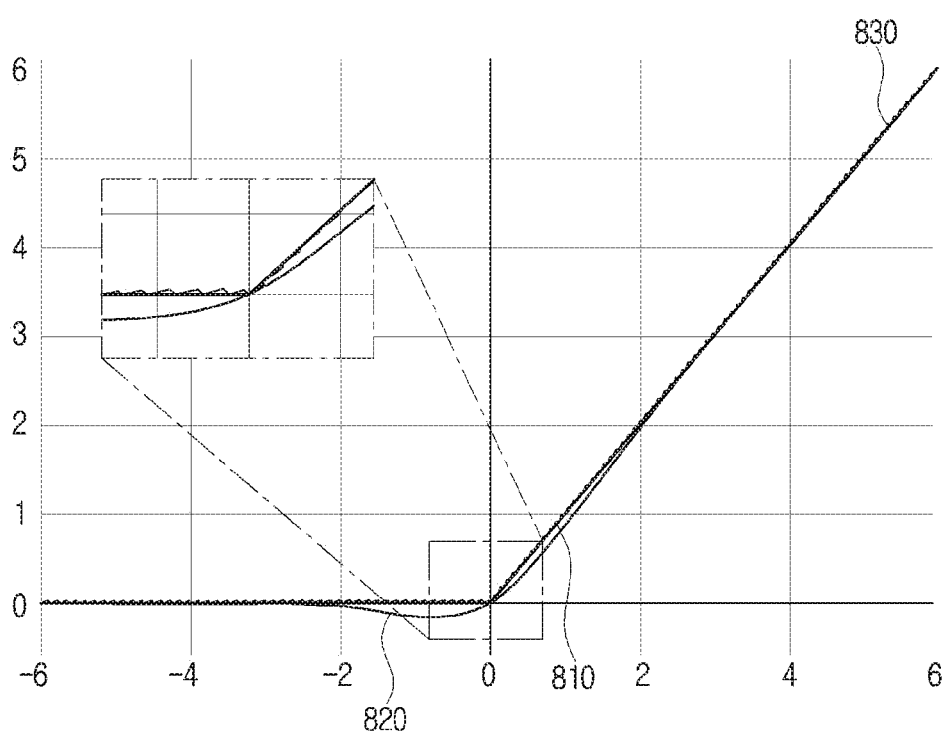
FIGS. 8 and 9 are graphs illustrating the characteristics of the activation function generated according to various embodiments of the disclosure in more detail.
Figure 9:
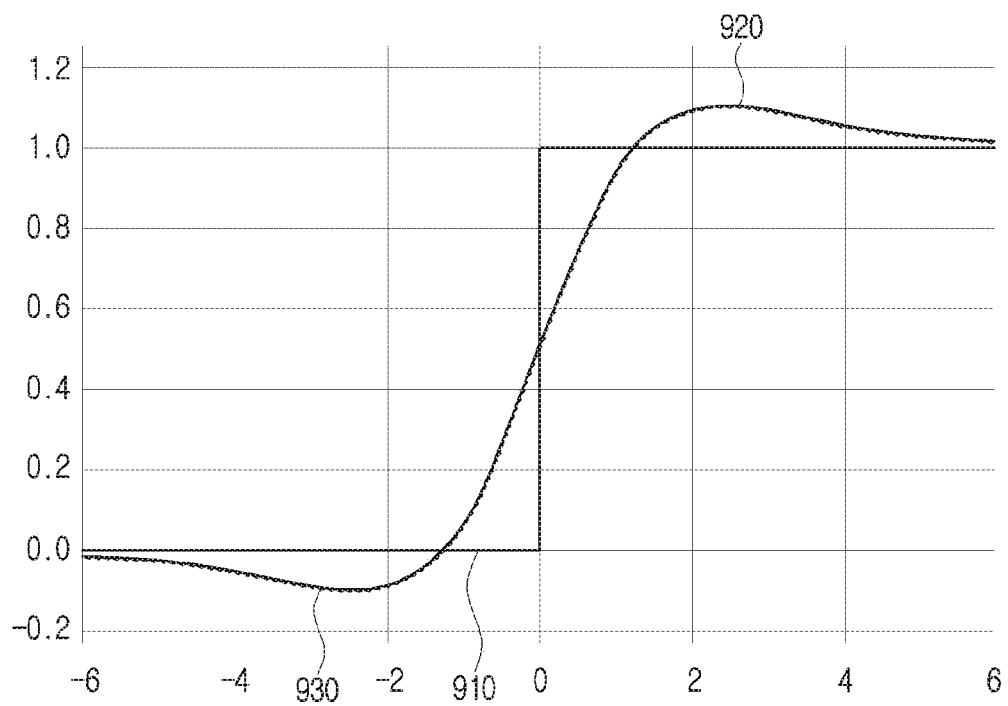

FIGS. 8 and 9 are graphs illustrating the characteristics of the activation function generated according to various embodiments of the disclosure in more detail.

Referring to FIGS. 8 and 9, they are described with an example of a case that new activation function information according to the disclosure is generated based on ReLU function information and GELU function information (hereinafter referred to as G-ReLU function information in the description of FIGS. 8 and 9).

FIG. 8 is a graph for comparing and explaining a function value of the ReLU function 810, a function value of the GELU function 820, and a function value of the G-ReLU function 830. Referring to FIG. 8, the function value of the G-ReLU function 830 shows a form approximate to the function value of the ReLU function 810. More specifically, unlike the function value of the ReLU function 810, the function value of the G-ReLU function 830 shows a trajectory that approximates the function value of the ReLU function 810 in a form of a sawtooth wave. This may indicate that the G-ReLU function may have similar features to the ReLU function while the neural network model is performing the feedforward process. Therefore, if the neural network model uses the G-ReLU function, the calculation speed of the neural network model may be improved as close as to the case of using the ReLU function.

Meanwhile, FIG. 9 is a graph for comparing and explaining a gradient of the ReLU function 910, a gradient of the GELU function 920, and a gradient of the G-ReLU function 930. Referring to FIG. 9, the gradient of the G-ReLU function 930 shows a form approximating the gradient of the GELU function 920. More specifically, unlike the gradient of the GELU function 920, the gradient of the G-ReLU function 930 shows a trajectory close to the gradient of the GELU function 920 in the form of a sawtooth wave. This means that the G-ReLU function may show features close to the GELU function while the neural network model is performing the backpropagation process. Therefore, if the neural network model uses the G-ReLU function, the learning performance of the neural network model may be improved to a degree close to the case of using the GELU function.

Meanwhile, a K value of a gradient transformation function is set to 10 and illustrated in graphs of FIGS. 8 and 9. However, this is only to allow each graph to be clearly and visually distinguished, and as described above in the description of FIG. 2, it is preferable to set the K value of the gradient transformation function as a sufficiently large value such as a value that exceeds $10^5$. And, if the K value is sufficiently large, the function value of the G-ReLU function will show a more approximate form to the function value of the ReLU function than illustrated in FIG. 8, and the gradient of the G-ReLU function will show a more approximate form to the gradient of the ReLU function than illustrated in FIG. 9.

Meanwhile, the ReLU function has been described as an example of an activation function having a high calculation speed and the GELU function has been described as an example of an activation function having excellent learning performance in the above, but the disclosure is not limited thereto. In particular, the activation function information having excellent learning performance may be Swish function information. According to the disclosure, when new activation function information is generated based on the ReLU function information and the Swish function information, a function value of the new activation function may approximate the function value of the ReLU function, and the gradient of the new activation function may approximate the gradient of the Swish function.

Figure 10:
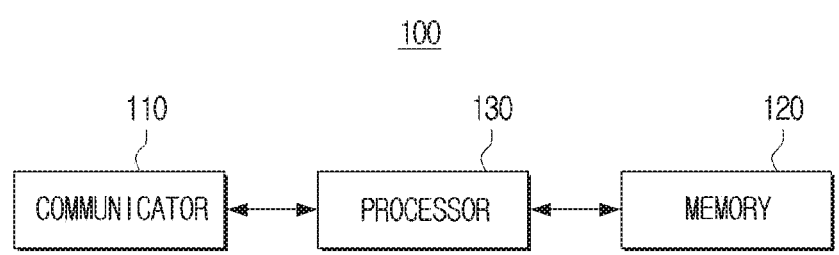
FIG. 10 is a block diagram illustrating a configuration of an electronic apparatus according to an embodiment of the disclosure.

FIG. 10 is a block diagram illustrating a configuration of an electronic apparatus according to an embodiment of the disclosure.

Referring to FIG. 10, the electronic apparatus 100 may include a communicator 110, a memory 120, and a processor 130. However, such a configuration is exemplary, and a new configuration may be added or some components may be omitted in addition to the configuration.

The communicator 110 may include a circuit and perform communication with an external device (including a server). Specifically, the processor 130 may receive various data or information from an external device connected through the communicator 110, or may transmit various data or information to the external device.

The communicator 110 may include a wireless local-area network (LAN) module and/or a short distance communication module. In particular, the wireless fidelity (WiFi) chip and the BT chip may perform communication using a WiFi method and a BT method, respectively. If the Wi-Fi module or the Bluetooth module is used, various kinds of connection information such as a subsystem identification (SSID), a session key and the like is transmitted and received first, and after establishing communication, various kinds of information may be transmitted and received.

The wireless communication module may perform communication in accordance with various communication standards, such as institute of electrical and electronics engineers (IEEE), ZigBee, 3rd Generation (3G), 3rd generation partnership project (3GPP), long term evolution (LTE), 5th generation (5G), and the like. The NFC module represents a module which is operated with a near field communication (NFC) method which uses 13.56 MHz band among various RF-ID frequency bands such as 135 kHz, 13.56 MHz, 433 MHz, 860-960 MHz, 2.45 GHz and the like.

In particular, in various embodiments according to the disclosure, the electronic apparatus 100 may be connected to an external device through the communicator 110. In addition, the processor 130 may receive activation function information and type information about the activation function information from the external device through the communicator 110. In particular, the processor 130 may receive the latest activation function information having a higher calculation speed than activation function information stored in the memory 120 or the latest activation function information having better learning performance than the activation function information stored in the memory 120 from the external device through the communicator 110. Meanwhile, the processor 130 may control the communicator 110 to transmit the activation function information and the type information about the activation function information to the external device.

At least one command related to the electronic apparatus 100 may be stored in the memory 120. In addition, an operating system (O/S) for driving the electronic apparatus 100 may be stored in the memory 120. Further, various software programs or applications for operating the electronic apparatus 100 may be stored in the memory 120 according to various embodiments of the disclosure. In addition, the memory 120 may include a semiconductor memory such as a flash memory or a magnetic storage medium such as a hard disk.

Specifically, various software modules for operating the electronic apparatus 100 may be stored in the memory 120 according to various embodiments of the disclosure, and the processor 130 may execute various software modules stored in the memory 120 to control the operation of the electronic apparatus 100. In other words, the memory 120 may be accessed by the processor 130, and perform readout, recording, correction, deletion, update, and the like, on data by the processor 130.

According to an embodiment of the disclosure, the term of the memory 120 may include the memory 120, read-only memory (ROM) (not illustrated), and random access memory (RAM) (not illustrated) within the processor 130, and a memory card (not illustrated) attached to the electronic apparatus 100 (e.g., micro secure digital (SD) card or memory stick).

In particular, in various embodiments according to the disclosure, the memory 120 may store a neural network model, and software modules such as a neural network model evaluation module, an activation function management module, specifically, an activation function generating module, an activation function determination module, an activation function loader, and the like. In addition, the memory 120 may store various activation function information provided in the manufacturing process, received from an external device, or generated by the electronic apparatus 100. For example, the memory 120 may store first activation function information, second activation function information, third activation function information, fourth activation function information, fifth activation function information, and sixth activation function information according to the disclosure, and type information for each activation function information.

In addition, various information necessary within the scope for achieving the purpose of the disclosure may be stored in the memory 120, and information stored in the memory 120 may be updated as received from an external device or input by the user.

The processor 130 controls the overall operation of the electronic apparatus 100. For example, the processor 130 may be connected to the configuration of the electronic apparatus 100 including the communicator 110 and the memory 120 as described above, and execute at least one instruction stored in the memory 120 to control the overall operation of the electronic apparatus 100.

The processor 130 may be implemented in various methods. For example, the processor 130 may be implemented as at least one of an application specific integrated circuit (ASIC), an embedded processor, a microprocessor, hardware control logic, a hardware finite state machine (FSM), or a digital signal processor (DSP). Meanwhile, in the disclosure, the term processor 130 may be referred to a meaning of including a central processing unit (CPU), a graphics processing unit (GPU), a main processing unit (MPU), or the like.

According to various embodiments of the disclosure, the processor 130 may control various configurations according to the disclosure to generate an activation function having high learning speed and excellent learning performance using two different activation functions. For example, in a state that a neural network model, an activation function generating module for generating activation function information used for the neural network model, first activation function information, second activation function information, and third activation function information generated based on the first activation function information and the second activation function information are stored in the memory 120, the processor 130 may receive the fourth activation function information from the external device through the communicator 110, and if the type information on the fourth activation function information corresponds to the type information on the second activation function information, the processor 130 may input the first activation function information and the fourth activation function information into the function generating module to generate the fifth activation function information, and may control the neural network model to change the activation function information used in the neural network model from the third activation function information to the fifth activation function information. Various embodiments according to the disclosure based on the control of the processor 130 have been described above with reference to FIGS. 1 to 9, and thus duplicate description will be omitted.

Meanwhile, the method of controlling the electronic apparatus according to the above-described various embodiments may be realized as a program and provided in the electronic apparatus 100. In particular, the program including the method of controlling the electronic apparatus 100 may be stored in a non-transitory computer readable medium and provided therein.

Specifically, as for a non-transitory computer-readable recording medium including a program that executes the method of controlling the electronic apparatus 100, the method of controlling the electronic apparatus 100 may include storing the neural network model, the activation function generating module for generating the activation function information used in the neural network model, the first activation function information, the second activation function information, and the third activation function information generated based on the first activation function information and the second activation function information, receiving the fourth activation function information from an external device, if the type information for the fourth activation function information corresponds to the type information for the second activation function information, inputting the first activation function information and the fourth activation function information to the activation function generating module to generate the fifth activation function information, and controlling the neural network model to change activation function information used in the neural network model from third activation function information to fifth activation function information.

The non-transitory computer readable recording medium indicates a medium which stores data semi-permanently and can be read by devices, rather than a medium storing data temporarily, such as register, cache, or memory. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The method of controlling the electronic apparatus 100 and the computer-readable recording medium including a program for executing the method of controlling the electronic apparatus 100 have been briefly described, but it is only for omitting redundant descriptions, and various embodiments of the electronic apparatus 100 may be applied to the method of controlling the electronic apparatus 100, and the computer-readable recording medium including a program for executing the method of controlling the electronic apparatus 100.

According to various embodiments of the disclosure as described above, the electronic apparatus 100 may generate a new activation function having a high learning speed and excellent learning performance to train the neural network model based on an activation function having a relatively high calculation speed and an activation function having a relatively high learning performance.

The electronic apparatus 100 may effectively update activation function information of the related art to improve the performance of the neural network model based on the latest activation function information. In particular, when the electronic apparatus 100 according to the disclosure is implemented in the form of an on-device that includes the neural network model, the electronic apparatus 100 may generate the activation function having a high calculation speed and high learning performance using the activation function information received from an external device to improve the performance of the neural network model without transmitting sensitive information related to the privacy of the user to the external device.

Furthermore, the electronic apparatus 100 may stop the learning process after the learning process is sufficiently performed by using the new activation function having high learning speed and excellent learning performance, and perform an inference process of the neural network model using activation function information which has lower learning performance but has higher calculation speed than that of the new activation function to maximize the calculation speed of the neural network model.

Meanwhile, functions related to artificial intelligence according to the disclosure are operated through the processor 130 and the memory 120. The processor 130 may be composed of one or a plurality of processors 130. In this case, the one or more processors 130 may be a general-purpose processor such as a CPU, an AP, or a digital signal processor (DSP), a graphics processor such as a GPU or a vision processing unit (VPU), or an artificial intelligence processor such as an NPU. The one or more processors 130 control to process the input data according to predefined operation rules or artificial intelligence models stored in the memory 120. Alternatively, when one or a plurality of processors 130 is an artificial intelligence-only processor, the artificial intelligence-only processor may be designed with a hardware structure specialized for processing a specific artificial intelligence model.

The predefined operation rules or artificial intelligence models are characterized by being generated through learning. Being generated through learning may indicate that a basic artificial intelligence model is learned using a plurality of learning data by a learning algorithm, thereby generating a predefined operation rule or artificial intelligence model set to perform a desired characteristic (or purpose). Such learning may be performed on the device on which artificial intelligence according to the disclosure is performed, or may be performed through a separate server and/or a system. Examples of learning algorithms may include supervised learning, unsupervised learning, semi-supervised learning, or reinforcement learning, but are not limited to the examples described above.

The artificial intelligence model may be composed of a plurality of neural network layers. Each of the plurality of neural network layers has a plurality of weight values and performs a neural network operation through calculation between a result of calculation of a previous layer and a plurality of weight values. The plurality of weight values of the plurality of neural network layers may be optimized by learning results of the artificial intelligence model. For example, a plurality of weight values may be updated so that a loss value or a cost value obtained from the artificial intelligence model is reduced or minimized during the learning process. The artificial neural network may include a deep neural network (DNN), a convolutional neural network (CNN), a deep neural network (DNN), a recurrent neural network (RNN), a restricted Boltzmann machine (RBM), a deep belief network (DBN), a bidirectional recurrent deep neural network (BRDNN) or Deep Q-Networks, but are not limited thereto.

Meanwhile, the storage medium readable by the device may be provided in the form of a non-transitory storage medium. The term "non-transitory storage medium refers to a tangible device and does not include a signal (e.g., electromagnetic wave), and the term does not distinguish between the case that the data is permanently stored in the storage medium and the case that the data is temporarily stored in the storage medium. For example, the "non-transitory storage medium" may include a buffer in which data is temporarily stored.

According to an embodiment, the method according to various embodiments disclosed in the disclosure may be provided as being included in a computer program product. The computer program product may be traded between sellers and buyers as products. The computer program product may be distributed in the form of a device-readable storage medium (e.g., compact disc read only memory (CD-ROM)) or through application stores (e.g., Play Store™), or may be distributed (e.g., downloaded or uploaded) directly or online between two user devices (e.g., smartphones). In the case of online distribution, at least some of the computer program products (e.g. downloadable apps) may be temporarily stored on a storage medium readable by a device, such as a manufacturer's server, an application store's server, or a relay server, or may be temporarily generated.

Generally, or additionally, some components (e.g., module or program) may be integrated into one entity and perform the same or similar functions performed by each corresponding component prior to integration.

Operations performed by a module, a program module, or other component, according to various embodiments, may be sequential, parallel, or both, executed iteratively or heuristically, or at least some operations may be performed in a different order, omitted, or other operations may be added.

The term "unit" or "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be configured with an application-specific integrated circuit (ASIC).

Various embodiments of the disclosure may be implemented with software including instructions stored in a non-transitory machine (e.g., computer) readable storage media. The machine may call the stored instructions from the storage media and may be operated according to the called instructions, and include an electronic apparatus (e.g., electronic apparatus 100) according to the disclosed embodiments.

When the instruction is executed by the processor, the processor may directly perform a function corresponding to the instruction using the other components, or under the control of the processor. Instructions may include code generated or executed by a compiler or an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communicator;
memory storing one or more computer programs, a neural network model, an activation function generating circuit that generates activation function information used in the neural network model, first activation function information comprising information about a first activation function, second activation function information comprising information about a second activation function in which the second activation function has a slower calculation speed in an inference process of the neural network model and a higher learning performance in a training process of the neural network model than the first activation function when used in the neural network model and executed by the electronic apparatus, and third activation function information generated based on the first activation function information and the second activation function information; and
one or more processors,
wherein the one or more computer programs include computer-executable instructions that, when executed by the one or more processors, cause the electronic apparatus to:
receive, through the communicator, fourth activation function information comprising information about a fourth activation function,
based on the receiving of the fourth activation function information, identify whether type information of the fourth activation function information corresponds to the first activation function information or the second activation function information based on type information of each activation function, and
in case that the type information of the fourth activation function information corresponds to the second activation function information, generate fifth activation function information by inputting the first activation function information and the fourth activation function information to the activation function generating circuit and control the neural network model to change the activation function information used in the neural network model from the third activation function information to the fifth activation function information, and
wherein identifying the type information of the fourth activation function further comprises:
identifying that the fourth activation function corresponds to either the first activation function or the second activation function, based on whether the fourth activation function has a higher calculation speed than other activation functions in the inference process of the neural network model or has a higher learning performance than the other activation functions in the training process of the neural network model.

2. The electronic apparatus of claim 1, wherein the one or more computer programs further include computer-executable instructions that, when executed by the one or more processors, cause the electronic apparatus to:
in case that the type information of the fourth activation function information corresponds to the first activation function information, generate sixth activation function information by inputting the second activation function information and the fourth activation function information to the activation function generating circuit and control the neural network model to change the activation function information used in the neural network model from the third activation function information to the sixth activation function information.

3. The electronic apparatus of claim 1, wherein the type information of the fourth activation function information includes at least one of:
information of calculation speed based on the neural network model using the fourth activation function information; or
information of learning performance based on the neural network model using the fourth activation function information.

4. The electronic apparatus of claim 1, wherein the one or more computer programs further include computer-executable instructions that, when executed by the one or more processors, cause the electronic apparatus to:
based on a predetermined at least one condition to stop learning being satisfied while performing a learning process of the neural network model according to the fifth activation function information, control the neural network model to stop the learning process of the neural network model, and
based on the first activation function information, control the neural network model to perform an inference process of the neural network model.

5. The electronic apparatus of claim 4, wherein the predetermined at least one condition to stop learning includes at least one of training of the neural network model progressing beyond a predetermined number of epochs, a loss of the neural network model reaching a predetermined threshold value or less, saturation of the neural network model, or performance of the neural network model measured based on a data set being above a predetermined criterion or more.

6. The electronic apparatus of claim 1,
wherein the third activation function information refers to activation function information acquired by changing a gradient of the first activation function, specified by the first activation function information, based on the second activation function information, and
wherein the fifth activation function information refers to activation function information acquired by changing the gradient of the first activation function based on the fourth activation function information.

7. The electronic apparatus of claim 6,
wherein a function value of the fifth activation function information is approximated to a function value of the first activation function information by the neural network model, and
wherein a gradient of a fifth activation function, specified by the fifth activation function information, is obtained based on subtracting the gradient of the first activation function from a gradient of the fourth activation function specified by the fourth activation function information.

8. The electronic apparatus of claim 1, wherein the first activation function information, the second activation function information, and the third activation function information are received through the communicator.

9. The electronic apparatus of claim 1,
wherein the first activation function information and the second activation function information are received through the communicator, and
wherein the third activation function information is acquired by inputting the first activation function information and the second activation function information to the activation function generating circuit.

10. A method of controlling an electronic apparatus, the method comprising:
storing, by the electronic apparatus in memory of the electronic apparatus, a neural network model, an activation function generating circuit that generates activation function information used in the neural network model, first activation function information comprising information about a first activation function, second activation function information comprising information about a second activation function in which the second activation function has a slower calculation speed in an inference process of the neural network model and a higher learning performance in a training process of the neural network model than the first activation function when used in the neural network model and executed by the electronic apparatus, and third activation function information generated based on the first activation function information and the second activation function information;
receiving, by the electronic apparatus through a communicator of the electronic apparatus, fourth activation function information comprising information about a fourth activation function;
based on the receiving of the fourth activation function information, identifying, by the electronic apparatus, whether type information of the fourth activation function information corresponds to the first activation function information or the second activation function information based on type information of each activation function; and
based on identifying that the type information of the fourth activation function information corresponds to the second activation function information, generating, by the electronic apparatus, fifth activation function information by inputting the first activation function information and the fourth activation function information to the activation function generating circuit and controlling the neural network model to change the activation function information used in the neural network model from the third activation function information to the fifth activation function information,
wherein identifying the type information of the fourth activation function further comprises:
identifying, by the electronic apparatus, whether the fourth activation function corresponds to the first activation function or the second activation function, based on whether the fourth activation function has a higher calculation speed than other activation functions in the inference process of the neural network model or has a higher learning performance than the other activation functions in the training process of the neural network model.

11. The method of claim 10, wherein the type information of the fourth activation function information includes at least one of:

information of calculation speed based on the neural network model using the fourth activation function information; or information of learning performance based on the neural network model using the fourth activation function information.

12. The method of claim 10, further comprising:

based on a predetermined at least one condition to stop learning being satisfied while performing a learning process of the neural network model according to the fifth activation function information, controlling, by the electronic apparatus, the neural network model to stop the learning process of the neural network model; and based on the first activation function information, controlling, by the electronic apparatus, the neural network model to perform an inference process of the neural network model.

13. The method of claim 12, wherein the predetermined at least one condition to stop learning includes at least one of training of the neural network model progressing beyond a predetermined number of epochs, a loss of the neural network model reaching a predetermined threshold value or less, saturation of the neural network model, or performance of the neural network model measured based on a data set being above a predetermined criterion or more.

14. The method of claim 10, wherein the third activation function information refers to activation function information acquired by changing a gradient of the first activation function, specified by the first activation function information, based on the second activation function information, and wherein the fifth activation function information refers to activation function information acquired by changing the gradient of the first activation function based on the fourth activation function information.

15. The method of claim 14, wherein a function value of the fifth activation function information is similar to a function value of the first activation function information, and wherein a gradient of a fifth activation function, specified by the fifth activation function information, is similar to a gradient of the fourth activation function specified by the fourth activation function information.

16. The method of claim 10, wherein the first activation function information, the second activation function information, and the third activation function information are received through the communicator.

17. The method of claim 10, wherein the first activation function information and the second activation function information are received through the communicator, and wherein the third activation function information is acquired by inputting the first activation function information and the second activation function information to the activation function generating circuit.

18. One or more non-transitory computer readable storage media storing one or more computer programs including computer-executable instructions that, when executed by one or more processors of an electronic apparatus, cause the electronic apparatus to perform operations, the operations comprising:

storing, by the electronic apparatus in a memory of the electronic apparatus, a neural network model, an activation function generating circuit that generates activation function information used in the neural network model, first activation function information comprising information about a first activation function, second activation function information comprising information about a second activation function in which the second activation function has a slower calculation speed in an inference process of the neural network model and a higher learning performance in a training process of the neural network model than the first activation function when used in the neural network model and executed by the electronic apparatus, and third activation function information generated based on the first activation function information and the second activation function information;

receiving, by the electronic apparatus through a communicator of the electronic apparatus, fourth activation function information comprising information about a fourth activation function;

based on the receiving of the fourth activation function information, identifying, by the electronic apparatus, whether type information of the fourth activation function information corresponds to the first activation function information or the second activation function information based on type information of each activation function; and based on identifying that the type information of the fourth activation function information corresponds to the second activation function information, generating, by the electronic apparatus, fifth activation function information by inputting the first activation function information and the fourth activation function information to the activation function generating circuit and controlling the neural network model to change the activation function information used in the neural network model from the third activation function information to the fifth activation function information, wherein identifying the type information of the fourth activation function further comprises:

identifying, by the electronic apparatus, whether the fourth activation function corresponds to the first activation function or the second activation function, based on whether the fourth activation function has a higher calculation speed than other activation functions in the inference process of the neural network model or has a higher learning performance than the other activation functions in the training process of the neural network model.

19. The electronic apparatus of claim 1, wherein the generating of the fifth activation function information includes adding to the first activation function a value obtained by multiplying a gradient transform function and a gradient function, wherein the gradient transform function is implemented as a form of a greatest integer function or step function, wherein the gradient function is obtained by subtracting a first activation derivation function from a fourth activation derivation function, wherein the first activation function comprises a rectified linear unit (ReLU) function, and wherein the fourth activation function comprises a gaussian error linear unit (GELU) function.

20. A method of controlling an electronic apparatus, the method comprising:

storing, by the electronic apparatus in memory of the electronic apparatus, a neural network model, an activation function generating circuit that generates activation function information used in the neural network model, first activation function information comprising information about a first activation function, second activation function information comprising information about a second activation function in which the second activation function has a slower calculation speed in an inference process of the neural network model and a higher learning performance in a training process of the neural network model than the first activation function when used in the neural network model and executed by the electronic apparatus, and third activation function information generated based on the first activation function information and the second activation function information;

receiving, by the electronic apparatus through a communicator of the electronic apparatus, fourth activation function information comprising information about a fourth activation function;

based on the receiving of the fourth activation function information, identifying, by the electronic apparatus, whether type information of the fourth activation function information corresponds to the first activation function information or the second activation function information based on type information of each activation function; and based on identifying that the type information of the fourth activation function information corresponds to the first activation function information, generating, by the electronic apparatus, sixth activation function information by inputting the second activation function information and the fourth activation function information to the activation function generating circuit and controlling the neural network model to change the activation function information used in the neural network model from the third activation function information to the sixth activation function information, wherein identifying the type information of the fourth activation function further comprises:

identifying, by the electronic apparatus, whether the fourth activation function corresponds to the first activation function or the second activation function, based on whether the fourth activation function has a higher calculation speed than other activation functions in the inference process of the neural network model or has a higher learning performance than the other activation functions in the training process of the neural network model.

* * * * *